J. KILBORN.
Corn-Harvesters.
No. 142,920.   Patented September 16, 1873.
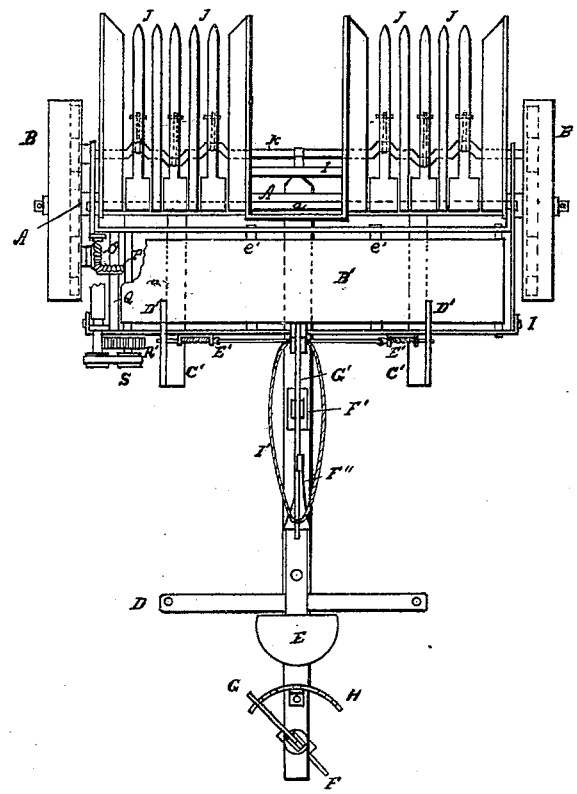
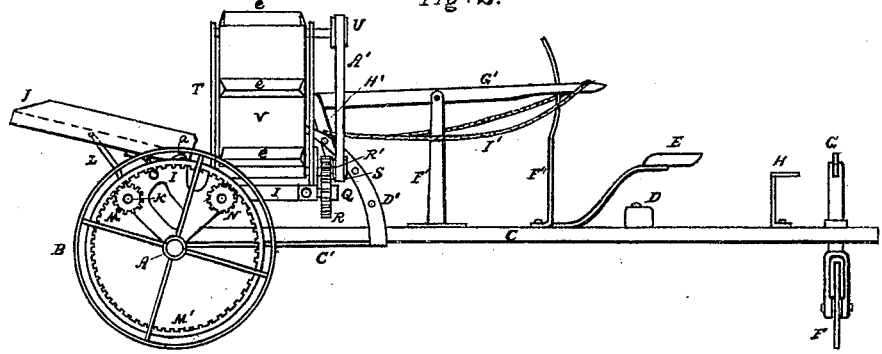
WITNESSES.  
John H Lawlor  
Patrick Harvey  
INVENTOR.  
John Kilborn  
By Gridley & Warner  
his Attys

UNITED STATES PATENT OFFICE.

JOHN KILBORN, OF CHICAGO, ILLINOIS, ASSIGNOR OF ONE-THIRD OF HIS RIGHT TO WILLIAM GRELLIER, OF SAME PLACE.

IMPROVEMENT IN CORN-HARVESTERS.

Specification forming part of Letters Patent No. 142,920, dated September 16, 1873; application filed June 4, 1873.

*To all whom it may concern:*

Be it known that I, JOHN KILBORN, of Chicago, in the county of Cook and State of Illinois, have invented a new, useful, and Improved Corn-Picker, of which the following is a full, clear, and exact description, which will enable others skilled in the art to which my invention appertains to make and use the same, reference being had to the accompanying drawing forming a part hereof, and in which—

Figure 1 represents a top or plan view of my improved picker, and Fig. 2 a side elevation of the same.

Like letters of reference indicate like parts.

My invention relates to a class of agricultural implements mounted upon wheels, and employed for the purpose of picking the ears of corn from the standing stalks. The object of my invention is to improve the construction and operation of implements of this class; and to that end it consists in certain novel features, hereinafter fully described and particularly set forth, relating to various parts of the implement.

In the drawing, A represents the draft-wheel axle, and B B are the draft-wheels loosely mounted thereon. C is the draft-pole rigidly attached to the central part of the axle. D is an evener pivoted to the draft-pole, and arranged at such a distance from the axle that the team may draw toward the wheels. E is the driver's seat. F is a guide-wheel arranged near the rear end of the draft-pole, and journaled in a vertical shank turning freely in the said pole. G is a handle or lever so pivoted to the upper end of the guide-wheel shank that the free end of the lever may be lifted or depressed. H is a rest or lock attached to the draft-pole, and bent in the form of the arc of a circle. Its upper edge is also notched to receive the free end of the lever, and retain it in any position during the operation of the implement. I is the picker-frame loosely mounted on the axle A. J J are the pickers, inclining upward as they extend forward. The pickers are arranged in two sets, as shown, so that each set will engage a row of stalks. The lateral pickers of each set are rigid, and are provided with side pieces, as indicated by dotted lines in Fig. 2. All the pickers are arranged upon a rod, *a*, extending from one side of the frame I to the other, and each alternate interior picker of each set is also rigid. K is a crank-shaft, and L L are pitmen attached to the cranks of the shaft K and to those pickers which are loosely mounted on the rod *a*. The crank-shaft is so bent that when rotated it will throw the free end of each alternate loose picker downward, and the free end of each other alternate loose picker upward at the same time. The free ends of the pickers are wedge-shaped, but not sharp enough to cut either the corn or the stalks. M is a spur-wheel loosely mounted on each end of the shaft K, and engaging the spurs M' attached to the driving-wheels and concentric therewith. Motion is communicated from the wheels M M to the shaft K through the medium of a hooked pawl attached to each of the said wheels, and engaging a corresponding ratchet-wheel rigidly attached to the said shaft, so that the shaft will be rotated only when the draft-wheels are moved forward, and so that the implement may be turned or moved in a curved line without imparting a tortional strain to the crank-shaft; but I have not shown the said pawls and ratchet-wheels, for the reason that I do not make special claim thereto. N is a spur-wheel, also engaging the spurs M' on one of the wheels B B. O is a beveled pinion on the arbor of the wheel N. P is a beveled pinion on the shaft Q, and engaging the pinion O. R is a spur-wheel on the shaft Q, and R' is a spur-wheel engaging the wheel R. S is a belt-wheel on the shaft of the wheel R'. The shafts K and Q, wheels N, R, R', and S, all have suitable bearings in the frame I. T is an elevator-frame extending upwardly from the frame I and inclining over the draft-wheel. U is a belt-wheel on a shaft having bearings in the upper end of the frame T. V is an endless elevator-apron arranged over the shaft of the wheel U, and over a roller arranged in the lower part of the frame T. *e e* are elevator-buckets attached to the apron V. A' is a belt arranged over the wheels S and U.

B' is an endless conveyer-apron, arranged over the shaft of the wheel S, and over a roller in the opposite end of the frame I. $e'\ e'$ are intermediate rollers supporting the apron B'. C' C' are arms, rigidly attached to the axle A, and extending rearward horizontally below the apron B'. D' D' are perforated arms, extending upward from the arms C' C' in the arc of a circle. E' E' are yielding pins, in brackets on the frame I, and arranged to enter the perforations of the arms D' D'. F' and F'' are vertical standards, extending upwardly from the draft-pole. The upper end of the standard F'' is notched and slightly curved, as shown in Fig. 2. G' is a lever, pivoted to the upper end of the standard F'. The rear end of the lever G' is constructed for arrangement in the notches of the standard F''. H' is a pitman or connecting-arm, pivoted to the forward end of the lever G', and to the frame I. I' is a cord, attached to each of the pins E' E', and passing through a hole in the arm H', from which it extends to the driver's seat, so as to be conveniently reached and operated.

Instead of making each alternate picker rigid all may have a vertically-vibrating movement, and instead of making the axle A straight it may be bent rearward just after leaving the inner face of the frame I, or at the point where the latter rests upon the axle, so that the axle will not be liable to strike the stalks and push them from the pickers. The shaft K may also be arranged further rearward for the same purpose. The cord I', instead of passing through a hole in the arm H', may run over pulleys, and, instead of extending it to the driver's seat, it may be attached to a sliding rod arranged on the lever G'. Instead of employing a crank-shaft K, for the purpose of moving the pickers, they may be moved by means of a straight crank provided with eccentrics.

It will be observed from the foregoing description that, as the implement is drawn forward, the pickers will ride among the stalks and strip the ears from them, leaving the stalks standing in the field. The movement of the pickers is such as to twist or bend the ears, and thus break them from the stalk.

After the ears are separated from the stalks the ears will slide rearward from the pickers and fall on the apron B', and the latter will conduct them to the elevator-buckets $e\ e$, which will dump them either into a wagon attending the implement or into a receptacle arranged on the implement for that purpose. In going up a hill or over uneven surfaces the inclination of the pickers may be adjusted by drawing the pins E' E' from the perforation in the arms D' D', and then adjusting the frame I, and its attachments, by means of the lever G'. The cord I' is then loosened, and the pins E' E' will then enter the perforations in the arms D' D' and retain the frame I' in its position. The implement is readily guided by means of the arm G.

Having thus described my invention, what I claim as new, and desire to secure by Letters Patent, is—

1. In a corn-picking implement, provided with a tilting and adjustable picker-frame, I, the inclined pickers J J mounted on the said frame, and each alternate one of which is rigidly attached thereto, and each other one of which is pivoted to the said frame, and rendered vertically vibrating by means of the pitmen L L attached thereto, and to the crank-shaft K having bearings in the said frame, the said pitmen being attached to the vibrating pickers at a point between the free ends and the pivots of the latter, substantially as and for the purposes specified.

2. In a corn-picking implement, the tilting picker-frame I, provided with the pickers J J and with the aprons B' and V, and with the laterally-yielding bolts E' E', all arranged substantially as described, in combination with the bent and perforated arms D' D' rigidly attached to the carriage-frame, substantially as and for the purposes specified.

3. In a corn-picking implement, provided with a tilting picker-frame, the combination and arrangement of the yielding pins E' E', one or more, one or more perforated arms, D' D', the cord I', the pivot-lever G' connected to the picker-frame, and the notched standard F'', all substantially as and for the purposes specified.

JOHN KILBORN.

Witnesses:
F. F. WARNER,
GEO. KILBORN.